Aug. 11, 1936.  R. W. ATKINSON  2,050,990

CABLE

Filed June 14, 1930

INVENTOR
Ralph W. Atkinson
BY
Emery, Booth, Varney & Whittemore
ATTORNEYS

Patented Aug. 11, 1936

2,050,990

UNITED STATES PATENT OFFICE 2,050,990

CABLE

Ralph W. Atkinson, Perth Amboy, N. J., assignor to General Cable Corporation, New York, N. Y., a corporation of New Jersey Application June 14, 1930, Serial No. 461,102

20 Claims. (Cl. 173—264)

This invention relates to sheathed, high-tension electric cables, and more particularly to such cables having included between the cable conductor or conductors and the sheath a body of insulating compound which fills all interstices and spaces within the sheath, and which is fluid or viscid at some temperature within the normal operating temperature range of the cable.

It is an object of this invention to provide an improved cable of the type described having a radially expansible and contractible sheath, so as to prevent the formation of voids in the cable insulation upon the expansion and contraction of the insulating compound, and under changing conditions of manufacture, installation and service. Other objects and advantages of the invention will appear hereinafter.

An illustrative embodiment of the invention selected merely for descriptive purposes is shown in the accompanying drawing, in which.

Figure 1:
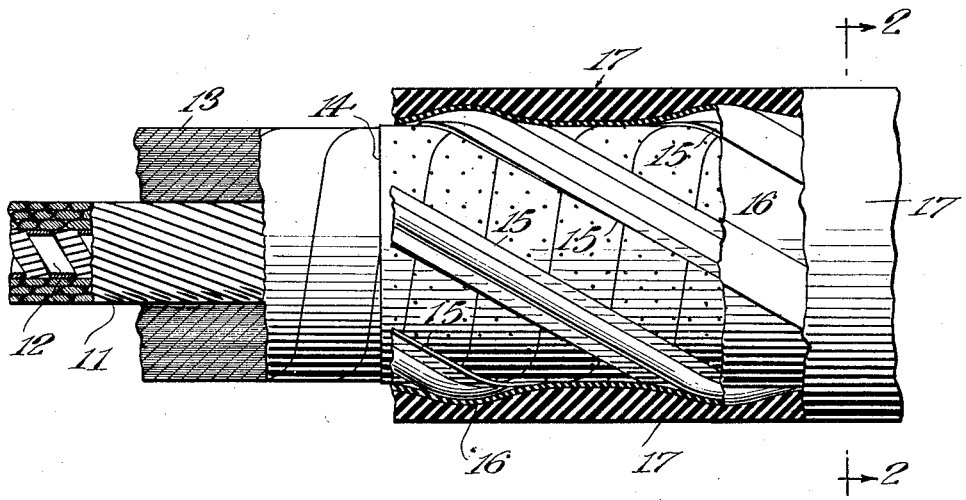
Fig. 1 is a plan view of a short section of single conductor cable having the sheath and insulation progressively removed and the parts shown partly in longitudinal section to disclose the construction.

Sheathed cable adapted for use at high voltages commonly has the conductor enveloped in a body of porous insulating material which serves to space and insulate the conductor from the sheath. In the case of multi-conductor cables the several conductors are individually insulated, and, prior to the application of the outer sheath, are assembled in parallel or twisted relation, usually with suitable fillers of porous material to form a substantially round core. Conveniently the individually insulated conductors in a multi-conductor cable may be held in assembled relation by means of a surrounding, spirally-wrapped, binding tape, for example, of steel.

The body of porous insulating material enveloping a cable conductor ordinarily is wrapped-on paper which preferably is thoroughly impregnated with an insulating compound filling all interstices in the porous insulation to raise the dielectric strength thereof. The impregnation usually takes place during the process of manufacture of the cable, either before or after the outer sheath has been applied, and preferably is done under a vacuum and heat to insure removal of all air and moisture. The insulating compound preferably completely fills all interstices and spaces within the cable sheath, exteriorly as well as interiorly of the porous insulation, which condition may be insured by continuously maintaining pressure on the body of compound filling the cable sheath.

The insulating compound may and preferably will be fluid or semi-fluid at temperatures within the normal operating temperature range of the cable; for example it may be an oil. In order to expedite and insure the complete filling of all spaces within the cable sheath with insulating compound, whether normally fluid or viscid, the cable preferably is provided with one or more longitudinally extending channels or ducts. These channels may be provided in any one or more of several different ways, for example: by employing a stranded hollow conductor; by using spacers between the insulated conductor and the cable sheath, or by providing longitudinally extending flutes on the inner surface of the sheath; or, in the case of multi-conductor cables, by providing longitudinally extending ducts in the filler spaces between the individually insulated conductors and the cable sheath.

Preferably the envelope of insulation about a conductor is immediately surrounded by a thin, snugly-adherent, permeable envelope of conducting material which forms an electrostatic shield. The continuity of this metallic envelope as an isolated conductor extending longitudinally of the cable preferably is broken, as by means of one or more conducting members extending longitudinally of the cable and in contact at least at one point with the envelope in each cable length. In lead sheathed cables the lead sheath ordinarily is in contact with the thin metallic envelope and renders the provision of additional conducting members unnecessary. Such a cable construction is disclosed in United States Letters Patent 1,199,789 granted October 3, 1916 on an application of Martin Hochstadter.

Enclosing the insulated and metal-enveloped conductor or conductors is the outer sheath, which should be impervious to prevent damage to the cable insulation by the escape of insulating compound or by the ingress of air and moisture. The sheath also should be flexible and preferably light in weight, in order to permit manipulation and to expedite handling of the cable during its shipment and installation. Furthermore, the sheath should be of such a character as adequately to protect the insulated conductor or conductors against mechanical injury during installation and operation.

Heretofore, in cables of the type described the outer sheath usually has been made of lead or of an alloy of lead. The weight of such a sheath is very great and comprises a substantial part of the total weight of the cable, thereby making the handling and installation of the cable difficult and costly. Since lead is an electrical conductor, there may be a substantial power loss and an undesirable heating in the sheath when the cable is in service, due to circulating currents induced in the sheath by the current flowing in the cable conductors. Furthermore, the sheath is subject both to corrosion and electrolytic reactions when installed, and consequently in time may be perforated, permitting escape of the insulating compound and ingress of air and moisture, thereby destroying the integrity of the cable insulation and eventually resulting in a a failure of the cable.

Lead and lead alloys which are used for cable sheaths are flexible, but for all practical purposes, are not resilient. During shipment, installation and operation the cable will be subject to a varying range of temperature which will result in an alternate expansion and contraction of the insulating compound with a resultant substantially continuous variation in the volume of the body of compound within the sheath. The expansion of the insulating compound results in an increase of pressure within the cable sheath, and, unless some arrangement is provided to take care of this increase in volume of the insulating compound, the increase in pressure will result in the sheath being stretched or ruptured.

A lead sheath will stretch under the pressure of the expanding compound, but, since it is not resilient, will not contract again when the volume of the insulating compound contracts. Consequently, as the volume of the insulating compound decreases, bubbles or spaces which are not occupied by insulating compound will be formed within the cable sheath between the insulated conductor and the sheath, or within the body of porous insulating material. These bubbles of gas or vapor, particularly if they are formed within the body of porous insulating material, materially reduce the dielectric quality of the cable insulation and may in time result in the failure of the cable.

In cable installations where the insulating compound is a liquid, the variation in volume of the liquid within the cable may be compensated for by connecting the cable at one or more points with an expansible and contractible external reservoir containing an additional body of insulating compound under pressure, and preferably by also providing channels extending longitudinally along and within the cable to permit a free exchange of insulating compound between the external reservoir and all parts of the cable insulation.

During installation of lead sheathed cables it is necessary to bend the cable, as for example, when it is reeled, unreeled, and drawn into conduits. This bending of the cable generally results in a stretching or wrinkling of the cable sheath with a probable consequent formation of bubbles of gas or vapor within the cable insulation. This danger may be avoided by connecting to the cable length during the time of shipment and installation an expansible and contractible reservoir containing an additional body of insulating compound under pressure.

If the cable sheath were resilient, so that it could expand and contract radially under pressure, any variation in the volume of the insulating compound within the cable sheath at any point throughout its length could readily be accommodated for by a stretching or contraction of the cable sheath and movement of the insulating compound radially of the cable without any substantial movement of compound longitudinally of the cable. The danger of bubbles of gas or vapor forming during the contraction of the insulating compound in a cable having a resilient sheath would be eliminated if the pressure on the compound initially was adjusted to a value such that at all temperatures to which the cable ever would be subject the pressure would be greater than that at which such bubbles form in the compound. It follows, that it would be practicable to ship, install and operate oil-filled cables without providing any external oil reservoirs to accommodate for expansion and contraction of the insulating compound.

In addition to the saving in the initial cost of such an installation due to the elimination of oil-supply equipment, there would be a continuing economy in the cost of operation. The elimination of the oil reservoirs, oil piping, and pipe joints, all of which take up limited and costly manhole space and which are readily subject to damage, would remove one important source of trouble, and consequently more nearly continuous service of the installation would be assured.

Since expansion of the insulating compound would be taken care of by movement of the compound radially of the cable, movement of insulating compound longitudinally of the cable during normal operation would be negligible. As a result the insulating compound within the cable might be viscous or relatively unyielding at normal operating temperatures without the danger of formation of bubbles of gas or vapor within the cable insulation or rupture of the cable sheath during contraction and expansion of the insulating compound.

Oil-filled cables have heretofore been constructed exclusively with non-resilient sheaths of metal, and the expansion and contraction of the oil has been taken care of by connecting to the cable an external body of oil under pressure. According to this invention a cable is provided which has a resilient sheath capable of variation in cross-sectional area, and which adequately accommodates for the expansion and contraction of the insulating compound substantially without the provision of external reservoirs of compound connected to the cable. Such a sheath will be referred to as a radially expansible and contractible sheath.

The outer sheath of the cable preferably comprises an impervious wall of tough, resilient and flexible material which is relatively light in weight, for example, a vulcanized rubber compound. The sheath material preferably will be age and abrasive resistant, as well as being highly resistant to acids and alkalis, and the sheath will be of a thickness sufficient to afford adequate mechanical protection to the insulated conductor or conductors.

The insulating compound with which the cable is filled may react injuriously with the material of the cable sheath, for example, oil and rubber. To prevent such reaction there is positioned immediately inside of the cable sheath a thin flexible and impervious wall which separates the sheath from the insulated conductor or conductors, thereby preventing any direct contact between the material of the sheath and the insulating compound with which the cable is filled. Since the primary function of this separator wall is merely to prevent access of the insulating compound to the sheath, the wall may be made as thin as is consistent with the requirement of continuity of surface during manufacture and under normal conditions of installation and operation.

The separator wall preferably will be made of some material which does not injuriously affect, and which is not injuriously affected by the impregnating compound with which the cable is filled. The separator wall should be expansible and contractible to accommodate for changes in the volume of the insulating compound, and may be made either of a suitable resilient material, or of a flexible, substantially non-resilient material, for example, lead or some other metal.

In the event that the separator wall is made of a substantially non-resilient material, such as a metal, the wall preferably will be constructed in such a manner that the necessary expansion and contraction is obtained by a distortion or bending of the wall. For example, the wall may be provided with longitudinally spiralled corrugations, as by applying the separator wall over a corrugated surface in such a manner that the wall will substantially conform to the shape of the corrugated surface.

Such a corrugated surface conveniently may be provided by the use of spacing members on the outer surface of the insulated conductor, for example a plurality of arched strips spiralled with a long lay about the insulated conductor. It will be apparent that these strips may be designed and applied in such a manner as to provide longitudinal oil channels between the sheath and the insulated conductor, and, if they are of metal and applied directly over the thin metallic envelope surrounding the insulated conductor, they also will serve to break the continuity of the thin metallic envelope as an isolated conductor extending longitudinally of the cable.

Merely by way of example, the separator wall may be applied by extruding a thin lead wall over the insulated conductor and the surrounding spiralled spacing members, and causing this lead wall to conform substantially to the underlying surface, either during extrusion or subsequently, as by evacuating the cable and pressing the wall inwardly between the spacing members. Thus it will be seen that a thin imperforate wall is provided which is expansible and contractible, the sections of the wall between the spacing members being free to bend about the spacing members as fulcrums. Since the expansion and contraction ordinarily will be distributed throughout a substantial portion the length of the cable, the actual bending of the wall at any point in the cable length will be very slight, and the cable may readily be designed so that the elastic limits of the separator wall are not exceeded.

Figure 2:
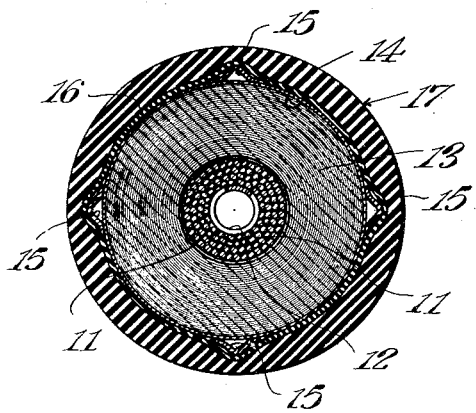
Fig. 2 is a transverse section on the line 2—2 of Fig. 1.

Referring to the drawing, Figs. 1 and 2 disclose a single conductor cable illustrating the invention. The cable conductor conveniently is of the hollow core type consisting of a central spiral coil 12, which may be of spring steel, and which supports the spiralled conducting strands 11 constituting the cable conductor. The spiral coil 12 defines a conduit permitting relatively free circulation of insulating compound longitudinally of the cable during manufacture, installation and service, and the assembly of the parts making up the conductor will be such as to permit movement of the insulating compound radially through the wall of the hollow core between the conduit and the insulation 13 which surrounds the conductor.

The insulation 13 preferably is a porous body of fibrous material, and may be wrapped-on paper which, before the cable is placed in service, is thoroughly impregnated with a suitable insulating compound, for example a fluid oil.

The insulated conductor may be immediately surrounded by a snugly adherent, permeable, metallic envelope 14. The continuity of the envelope 14 as an isolated conductor extending longitudinally of the cable desirably is broken by means of one or more conducting members 15. The members 15, of which four are shown in the drawing, conveniently may be of the arched form shown, and preferably are spiralled about the cable with a relatively long lay.

Enclosing the insulated and metal-enveloped conductor exteriorly of the members 15 is a thin, flexible impervious wall 16, for example of lead, which may be formed in place around the insulated conductor in any suitable manner, as by extrusion. The members 15 serve as spacing members tending to space the wall 16 from the metallic envelope 14. Preferably the wall 16 will be made to substantially conform to the core on which it is extruded, either during the extruding process, or by pressing or drawing the wall inwardly between the spacing members 15 after the wall has been extruded in place. It will be apparent that the wall 16 forms a barrier separating the insulating compound within the cable from the surrounding relatively thick sheath 17, which is resilient, and conveniently is made of vulcanized rubber.

The spacing members 15 provide channels for the flow of insulating compound longitudinally of the cable between the wall 16 and the cable insulation, and also provide bearing lines or fulcrums about which the sections of the wall 16 between the spacing members may have a pivotal or swinging movement. It will be seen that with such an arrangement the cross sectional area enclosed within the wall 16 may readily vary by reason of the bending movement of the wall 16 on lines along the spacing members 15 without stretching or compression of the material from which the wall is formed.

Figure 3:
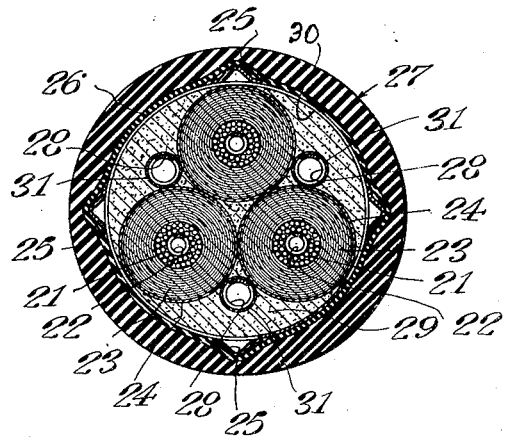
Fig. 3 is a transverse section through a three conductor cable embodying this invention.

Fig. 3 shows a three conductor cable illustrating the invention. Each of the cable conductors comprises a spiral coil 22 defining a conductor about which are spiralled the conducting strands 21. The conductor is enclosed in a body of porous insulation 23, conveniently wrapped-on paper, which may be immediately surrounded by a snugly-adherent, permeable, metallic envelope 24. Three conductors insulated in this manner are assembled with suitable filler material 29 to form a spirally round core which may be bound together with a surrounding spiralled wrapping 30, for example a steel tape.

Conveniently one or more channels 28 are provided in the filler space between the conductors to permit free movement of the insulating compound longitudinally of the cable. These channels 28 may take any suitable form, for example helical supporting members, such as spiralled steel springs, overlaid with a thin layer 31 of wrapped paper, the paper preventing obstruction of the channels by the filler material 29.

Spacing members 25 corresponding to the spacing members 15 in the single conductor cable are positioned on the cable over the steel tape 30 for the purpose of providing lines about which the separator wall 26 may bend. The wall 26 is similar to the wall 16 in the single conductor cable, and is in turn surrounded by an outer sheath 27 of resilient material, such as vulcanized rubber.

It will be understood that cable made in accordance with this invention may be dried and impregnated in any suitable manner, either before or after the impervious outer sheath has been applied. By way of example, the cable may be partially dried prior to the application of the thin impervious wall of flexible material, and then preferably maintained in a dried and heated condition until after the thin impervious wall is in place. Drying may then be completed by heating the cable and applying to its ends a vacuum to withdraw the air and any remaining moisture. Conveniently the dried cable may be flushed with an inert gas to remove any last traces of air or moisture.

Impregnation of the dried cable with an insulating compound may take place either prior to or after the application of the outer resilient sheath, and may readily be accomplished by means of the oil ducts extending longitudinally of the cable within the sheath. If the outer resilient sheath is of rubber, ordinarily, it will be vulcanized in place under pressure, and, if the cable has been filled with insulating compound, means must be provided at the ends of the cable to accommodate for the expansion of the insulating compound occasioned by the heating of the rubber during vulcanization. Conveniently, insulating compound is not admitted to the interior of the cable until after the outer sheath has been completed.

After the sheathed cable has been impregnated and filled with insulating compound, pressure is applied to the body of insulating compound within the cable sheath, the cable ends are sealed off in any suitable manner, and the cable is then ready for testing or shipment. The initial pressure applied to the insulating compound within the cable prior to sealing off the sheathed ends preferably will be such that it will prevent the formation of bubbles of gas or vapor in the cable insulation at all temperatures to which the sealed cable will be subjected, and under all conditions of shipment and installation.

The application of such an initial pressure to the insulating compound prior to sealing the cable ends results in a stretching of the expansible and contractible cable sheath, and provides a reserve supply of insulating compound between the cable sheath and the insulated conductor. As the insulating compound contracts in volume, for example as the temperature drops, the cable sheath contracts and forces this reserve supply of compound into the cable insulation, thereby preventing the formation of bubbles of gas or vapor. It will be obvious that the initial pressure to be applied to the insulating compound may be readily computed from the dimensions of the cable, the characteristics of the insulating compound, and the temperatures to which the cable will be subjected.

It will be seen that this invention provides a cable filled with an insulating compound and having a radially expansible and contractible sheath, whereby the integrity of the cable insulation is maintained at all times and under all conditions. The impregnating compound for the cable is self-contained and self-sufficient, and external reservoirs and supply tanks for impregnating compound are eliminated. A cable is provided which is more economical to manufacture, ship, install, operate and maintain.

It will be understood that the invention is not to be limited to the illustrative embodiment disclosed, but may be variously modified and embodied within the scope of the claims.

I claim:

1. In sheathed, high tension electric cable, the combination of a conductor, an enveloping body of porous insulating material, a thin layer of conducting material closely overlying and shielding the porous insulating material, a plurality of spacing members wrapped spirally about the insulated conductor over the thin conducting layer, a thin impervious wall of flexible material enclosing the insulating conductor exteriorly of said thin conducting layer and the spacing members to form an expansible and contractible corrugated jacket about the insulated conductor, and defining with the insulated conductor and the spacing members channels for the flow of oil longitudinally of the cable, a relatively thick impervious covering of resilient vulcanized rubber overlying the thin corrugated wall and constituting therewith an expansible and contractible sheath, and a body of oil filling all interstices and spaces within the cable sheath under pressure which will prevent the formation of bubbles of gas or vapor at all temperatures to which the cable may be subject, the oil and the material of the corrugated jacket being substantially mutually non-reactive, and the construction being such that changes in the volume of oil within the cable sheath may be accommodated for by radial expansion and contraction of the sheath.

2. In sheathed, high tension electric cable, the combination of a conductor, an enveloping body of porous insulating material, a thin layer of conducting material closely overlying and shielding the porous insulating material, a plurality of spacing members wrapped spirally about the insulated conductor over the thin conducting layer, a thin impervious wall of flexible material enclosing the insulated conductor exteriorly of said thin conducting layer and the spacing members to form an expansible and contractible corrugated jacket about the insulated conductor, and defining with the insulated conductor and the spacing members channels for the flow of insulating compound longitudinally of the cable, a relatively thick impervious covering of resilient insulation overlying the thin corrugated wall and constituting therewith an expansible and contractible sheath, and a body of fluid insulating compound filling all interstices and spaces within the cable sheath under pressure which will prevent the formation of bubbles at all temperatures within the normal operating temperature range of the cable, the insulating compound and the material of the corrugated jacket being substantially mutually non-reactive, and the construction being such that changes in the volume of the insulating compound may be accommodated for by radial expansion and the contraction of the cable sheath.

3. In sheathed, high tension electric cable, the combination of a conductor, an enveloping body of porous insulating material, a thin layer of conducting material closely overlying and shielding the porous insulating material, a thin impervious wall of flexible material enclosing the insulated conductor exteriorly of said thin conducting layer and forming an expansible and contractible corrugated jacket about the insulated conductor, a relatively thick impervious elastic covering comprising resilient vulcanized rubber overlying the thin corrugated wall and constituting therewith an expansible and contractible sheath, and a body of oil under pressure filling all interstices and spaces within the cable sheath, the oil and the material of the corrugated jacket being mutually non-reactive, and the construction of said sheath being such that changes in the volume of the oil are promptly accommodated for by radial expansion and contraction of the cable sheath to prevent any substantial increase in pressure within the sheath as the oil volume increases and to prevent the formation of bubbles within the sheath as the oil volume decreases.

4. In sheathed, high tension electric cable, the combination of a conductor, an enveloping body of porous insulating material, a thin layer of conducting material closely overlying and shielding the porous insulating material, a thin impervious wall of flexible material enclosing the insulated conductor exteriorly of said thin conducting layer, a relatively thick impervious covering of resilient insulation overlying the thin wall and constituting therewith an expansible and contractible sheath, and a body of insulating compound under pressure filling all interstices and spaces within the cable sheath, the construction of the said sheath being such that changes in the volume of the insulating compound are promptly accommodated for by radial expansion and contraction of the cable sheath to prevent any substantial increase in pressure within the sheath as the insulating compound expands and to prevent the formation of bubbles within the sheath as the insulating compound contracts.

5. In sheathed, high tension electric cable, the combination of a conductor, an enveloping body of porous insulating material, a thin impervious wall of flexible metal loosely enclosing the insulated conductor and forming an expansible and contractible corrugated jacket about the insulated conductor, a relatively thick impervious covering of resilient insulation overlying the thin corrugated wall and constituting therewith an expansible and contractible sheath for the cable, and a body of insulating compound under pressure filling all interstices and spaces within the cable sheath, the construction of the said sheath being such that changes in the volume of the insulating compound are promptly accommodated for by radial expansion and contraction of the cable sheath to prevent any substantial increase in pressure within the sheath as the insulating compound expands and to prevent the formation of bubbles within the sheath as the insulating compound contracts.

6. In a sheathed, high tension electric cable, the combination of a conductor, an enveloping body of porous insulating material, an impervious covering of resilient vulcanized rubber enclosing the insulated conductor and constituting an outer sheath, a body of insulating compound under pressure filling all interstices in the porous insulating material and all spaces within the cable sheath, and a thin impervious wall of material which is substantially mutually non-reactive with the insulating compound separating the insulated conductor from the rubber sheath and constituting with the rubber covering and expansible and contractible sheath for the cable, the construction of the said sheath being such that changes in the volume of the insulating compound are promptly accommodated for by radial expansion and contraction of the cable sheath to prevent any substantial increase in pressure within the sheath as the insulating compound expands and to prevent the formation of bubbles within the sheath as the insulating compound contracts.

7. In sheathed, high tension electric cable, the combination of a conductor, an enveloping body of porous insulating material impregnated with an insulating compound, a thin layer of conducting material closely overlying and shielding the impregnated insulating material, a thin impervious wall of flexible material which is mutually non-reactive with the insulating compound and which encloses the insulated conductor exteriorly of said thin conducting layer, and a relatively thick impervious covering of resilient vulcanized rubber overlying the thin flexible wall and constituting therewith a radially expansible and contractible sheath, whereby changes in the volume of insulating compound are promptly accommodated for by radial expansion and contraction of the cable sheath to prevent any substantial increase in pressure within the sheath as the insulating compound expands and to prevent the formation of bubbles within the sheath as the insulating compound contracts.

8. In sheathed, high tension electric cable, the combination of a conductor, an enveloping body of porous insulating material impregnated with an insulating compound, a thin layer of conducting material closely overlying and shielding the impregnated insulating material, a plurality of spacing members wrapped spirally about the insulated conductor over the thin conducting layer, a thin impervious wall of flexible material which is mutually non-reactive with the insulating compound and which encloses the insulated conductor exteriorly of said thin conducting layer and the spacing members to form an expansible and contractible corrugated jacket about the insulated conductor, and to define with the insulated conductor and the spacing members channels for the flow of insulating compound longitudinally of the cable, and a relatively thick impervious covering of resilient vulcanized rubber overlying the corrugated wall and constituting therewith an expansible and contractible sheath, whereby changes in the volume of the insulating compound may be accommodated for by radial expansion and contraction of the cable sheath.

9. In sheathed, high tension electric cable, the combination of a conductor, an enveloping body of porous insulating material impregnated with an insulating compound, a thin impervious wall of flexible material mutually non-reactive with the insulating compound and enclosing the insulated conductor, and a relatively thick impervious covering of resilient vulcanized rubber overlying the thin flexible wall and constituting therewith a readily expansible and contractible sheath, the construction of said sheath being such that changes in the volume of the insulating compound are promptly accommodated for by radial expansion and contraction of the cable sheath to prevent any substantial increase in pressure within the sheath as the insulating compound expands and to prevent the formation of bubbles within the sheath as the insulating compound contracts.

10. In sheathed, high tension electric cable, the combination of a conductor, an enveloping body of porous insulating material impregnated with an insulating compound, a thin impervious wall of flexible material mutually non-reactive with the insulating compound and enclosing the insulated conductor, and a relatively thick impervious covering of resilient material overlying and protecting the thin flexible wall and constituting therewith a readily expansible and contractible sheath, the construction of said sheath being such that changes in the volume of the insulating compound are promptly accommodated for by radial expansion and contraction of the cable sheath to prevent any substantial increase in pressure within the sheath as the insulating compound expands and to prevent the formation of bubbles within the sheath as the insulating compound contracts.

11. In sheathed, high tension electric cable, the combination of a conductor, an enveloping body of porous insulating material impregnated with an insulating compound, a laminate impervious covering of flexible material enclosing the insulated conductor and forming a readily expansible and contractible outer sheath, one layer of said laminate covering being impervious and subject to reaction with the insulating compound, and another layer thereof interiorly of the first mentioned layer being impervious to and substantially unaffected by the insulating compound, and a body of insulating compound under pressure filling all interstices and spaces within the cable sheath, the construction of said sheath being such that it promptly follows variation in the volume of the contained insulating compound, expanding to relieve the pressure within the sheath as the volume of the compound increases and contracting to prevent the formation of bubbles within the sheath as the volume of compound decreases.

12. In sheathed, high tension electric cable, the combination of a conductor, an enveloping body of porous insulating material impregnated with an insulating compound, a thin layer of conducting material closely overlying and shielding the impregnated insulating material, a thin impervious radially expansible and contractible wall of material mutually nonreactive with the insulating compound enclosing the insulated conductor, and a relatively thick impervious elastic outer sheath of insulating material subject to reaction with the insulating compound overlying the impervious wall, the construction of the thin impervious wall and the elastic sheath being such that changes in the volume of the insulating compound due to temperature variation are promptly accommodated for by radial expansion and contraction of the cable sheath to relieve the pressure within the sheath as the insulating compound expands and to prevent the formation of bubbles within the sheath as the insulating compound contracts.

13. In sheathed, high tension electric cable, the combination of a conductor, an enveloping body of insulating material, an impervious wall of flexible material enclosing the insulated conductor, said wall being substantially thinner than the normal sheath and, because of its thinness, affording inadequate mechanical protection to the insulated conductor, a relatively thick covering of resilient insulation wholly overlying the thin wall and affording adequate mechanical protection for the insulated conductor, said thin wall and thick covering together constituting a readily expansible and contractible sheath, and a body of insulating compound filling all interstices and spaces within the cable sheath, said resilient insulation being subject to reaction with the insulating compound and the material of said thin wall being substantially unaffected by the insulating compound, said sheath because of its flexibility and elasticity responding promptly to changes in the volume of the contained insulating compound to prevent any substantial increase in pressure within the sheath as the volume of the insulating compound increases and to prevent the formation of bubbles within the sheath as the volume of the insulating compound decreases.

14. In sheathed, high tension electric cable, the combination of a conductor, an enveloping body of insulating material, spacing members located on the outer surface of said insulated conductor, a thin impervious wall of flexible material enclosing the insulated conductor, a relatively thick covering of resilient insulation overlying the thin wall and constituting therewith an expansible and contractible sheath adapted to flex inwardly and outwardly about said spacing members, and a body of insulating compound filling all interstices and spaces within the cable sheath under pressure which will prevent the formation of bubbles at all temperatures within the normal operating temperature range of the cable.

15. In sheathed, high tension electric cable, the combination of a conductor, an enveloping body of insulating material, spacing members located on the outer surface of said insulated conductor, a thin impervious wall of flexible material enclosing the insulated conductor, a relatively thick covering of resilient insulation overlying the thin wall and constituting therewith an expansible and contractible sheath adapted to flex inwardly and outwardly about said spacing members, and a body of insulating compound filling all interstices and spaces within the cable sheath.

16. In sheathed, high tension electric cable, the combination of a conductor, an enveloping body of insulating material, spacing members located on the outer surface of said insulated conductor, a thin metallic wall enclosing said insulated conductor and spacing members, and a relatively thick covering of resilient insulation overlying the metallic wall and constituting therewith a radially expansible and contractible sheath adapted to flex inwardly and outwardly about said spacing members.

17. In sheathed, high tension electric cable, the combination of a conductor, an enveloping body of porous insulating material impregnated with an insulating compound, an enclosing elastic, outer sheath which is radially expansible and contractible to accommodate for changes in the volume of the insulating compound due to temperature changes but which comprises material subject to reaction with the insulating compound, and a relatively thin impervious layer of elastic non-metallic material mutually non-reactive with the insulating compound separating the cable insulation and the sheath, said relatively thin layer being radially expansible and contractible to permit expansion and contraction of the outer sheath as the volume of insulating compound in the cable changes.

18. In sheathed, high tension electric cable, the combination of a conductor, an enveloping body of porous insulating material impregnated with an insulating compound, a closed elastic, outer sheath which is readily expansible and contractible to accommodate for changes in the volume of the insulating compound due to temperature changes and which provides adequate mechanical protection for the insulated conductor, said sheath comprising material which is subject to reaction with the insulating compound and a relatively thin impervious layer of metal separating the cable insulation and the sheath, said relatively thin layer, because of its thinness, affording inadequate mechanical protection to the insulated conductor but being radially expansible and contractible to permit expansion and contraction of the outer sheath as the volume of insulating compound in the cable changes, said thin layer and sheath being of such construction that together they promptly follow variation in the volume of insulating compound to relieve pressure within the sheath as the insulating compound expands and to prevent the formation of bubbles within the sheath as the insulating compound contracts.

19. In sheathed, high tension electric cable, the combination of a conductor, an enveloping body of porous insulating material impregnated with an insulating compound, a laminate impervious covering comprising layers of elastic, non-metallic material one layer of which is subject to reaction with the insulating compound and another layer interiorly thereof which is substantially unaffected by the insulating compound, said laminate covering enclosing the insulated conductor and forming an expansible and contractible outer sheath, whereby changes in the volume of the insulating compound may be accommodated for by radial expansion and contraction of the cable sheath, and a body of insulating compound under pressure which will prevent the formation of bubbles at all temperatures within the normal operating temperature range of the cable filling all interstices and spaces within the cable sheath.

20. In sheathed, high tension electric cable, the combination of a conductor, an enveloping body of porous insulating material impregnated with an insulating compound, a thin layer of conducting material closely overlying and shielding the impregnated insulating material, a radially expansible and contractible, elastic wall of non-metallic material which is substantially unaffected by the insulating compound enclosing the insulated conductor, and an elastic outer sheath of insulating material which is subject to reaction with the insulating compound overlying the impervious wall, whereby changes in the volume of the insulating compound due to temperature variation may be accommodated for by radial expansion and contraction of the cable sheath.

RALPH W. ATKINSON.

CERTIFICATE OF CORRECTION.

Patent No. 2,050,990. August 11, 1936.

RALPH W. ATKINSON.

It is hereby certified that error appears in the printed specification of the above numbered patent requiring correction as follows: Page 2, first column, line 19, strike out the article "a"; page 4, second column, line 62. claim 2, strike out "the"; page 5, first column, line 67, claim 6, for "and" read an; and that the said Letters Patent should be read with these corrections therein that the same may conform to the record of the case in the Patent Office.

Signed and sealed this 12th day of January, A. D. 1937.

(Seal)

Henry Van Arsdale
Acting Commissioner of Patents.